United States Patent [19]

Deleuze et al.

[11] 4,210,446

[45] Jul. 1, 1980

[54] ALUMINUM ALLOY FOR ENAMELLING

[75] Inventors: Michel Deleuze, Annecy; François-Regis Boutin, Virieu sur Bourbre; Daniel Marchive, Coublevie, all of France

[73] Assignee: Forges de Crans, Annecy, France

[21] Appl. No.: 897,720

[22] Filed: Apr. 19, 1978

[30] Foreign Application Priority Data

May 24, 1977 [FR] France .................. 77 16631

[51] Int. Cl.$^2$ .................................. C22C 21/02
[52] U.S. Cl. ............................ 75/148; 75/143; 148/32; 427/376.4
[58] Field of Search ............... 75/148, 143; 148/32; 427/376 C

[56] References Cited
FOREIGN PATENT DOCUMENTS 208086 3/1960 Austria .
613589 11/1926 France .

Primary Examiner—R. Dean
Attorney, Agent, or Firm—McDougall, Hersh & Scott

[57] ABSTRACT

Aluminum alloy intended more particularly for the manufacture of enamelled articles having good characteristics in the annealed state and excellent behavior of the enamel, the aluminum alloy having the following composition:

Si: 1 to 1.5%
at least one of the elements of the group Fe-Ni-Co in a total quantity between 0.3 and 2%
at least one of the elements of the group Mo-Nb-Ta in a total quantity between 0.05 and 1%
Cr: 0.05 to 0.2%
Cu: <0.02%
Mg: <0.01%
the remainder being aluminum with the standard impurities.

4 Claims, No Drawings

ALUMINUM ALLOY FOR ENAMELLING

The present invention relates to an aluminum alloy used more particularly in the manufacture of enamelled articles, such as culinary utensils.

The alloys which have mainly been used hitherto for enamelling purposes are in accordance with the designations of the Aluminum Association, 1050 (99.5% aluminum) and 3003 (aluminum-manganese alloy containing 1% Mn).

The use of aluminum 1050 ensures a good behavior of the enamel, as is shown by the various tests to which enamelled articles are normally subjected. However, as it is necessary to anneal the article for enamelling, its low mechanical strength in the annealed state does not permit the manufacture of robust articles, unless very great thicknesses are used which makes the cost prohibitive.

The use of an aluminum-manganese alloy, such as 3003, ensures a better rigidity of the enamelled articles after annealing, but the behavior of the deposited enamel in use is inferior. In addition, the transformation of this alloy necessitates appropriate heat treatments, and in particular homogenization and intermediate annealing, which are complicated and costly.

The object of the present invention is to obviate these disadvantages and provide an alloy having satisfactory characteristics in the annealed state and which ensures an excellent behavior of the deposited enamel, whilst avoiding addition of elements which are forbidden by the relevant standards or are dangerous in contact with foodstuffs.

The enamelling alloy according to the invention has the following composition (by weight):
Si: 1 to 1.5%
at least one of the elements of the group Fe-Ni-Co in a total quantity between 0.3 and 2%
at least one of the elements of the group Mo-Nb-Ta in a total quantity between 0.05 and 1%
Cr: 0.05 to 0.2%
Cu: <0.2%
Mg: <0.01%
the remainder being aluminum with the standard impurities.

The alloy may also contain zirconium in a quantity less than 0.5%, either as a replacement for chrome or together with the latter.

The addition of silicon gives the alloy good rigidity in the annealed state. This addition is preferable to an addition of magnesium because the latter has an unfavorable influence on the adhesion of the enamel layer, unless a chromating treatment is performed which is not authorized for culinary articles. In addition, copper is prohibited for use in household articles by the relevant French standards.

The addition of silicon must be limited. Thus, standard aluminum-silicon alloys in which the silicon content varies between 5 and 13% are not suitable for stamping and can only be used for certain unstamped accessories such as handles, connecting pieces, etc.

It has been established through research that the adhesion of the enamel is favorably influenced by the presence of the elements Fe, Ni and Co on the one hand and Mo, Nb and Ta on the other, the combination between the elements of the two groups being particularly advantageous.

The combination Fe-Mo is the most advantageous, both from the economic standpoint and with respect to the mechanical characteristics of the alloys in the annealed state.

Chromium and zirconium do not have a significant effect on the adhesion of the enamel, but they do improve the mechanical characteristics.

In the case of culinary utensils, it is quite usual to associate an enamel layer on the outside with a non-stick coating on the inside, for example PTFE "Polytetrafluorethylene". None of the above elements has an unfavorable action on the adhesion of the PTFE coating. It is merely necessary to avoid titanium and keep the content of this element very low because it can destroy PTFE adhesion.

No special problem is caused by the production of the alloys according to the invention. This is unlike the case of Al-Mn alloys where the introduction of manganese is always difficult. Transformation, particularly rolling into sheets and strips, is completely comparable to that of an alloy 1050.

EXAMPLE

The four following alloys were produced in accordance with the compositions given in the following Table I:

| ALLOY | Si | Fe | Ni | Mo | Cr | Cu | Mg | Ti | Zr |
|---|---|---|---|---|---|---|---|---|---|
| 1 | 1.18 | 0.74 | — | — | 0.15 | <0.01 | <0.01 | <0.02 | — |
| 2 | 1.19 | 0.71 | — | 0.51 | 0.15 | <0.01 | <0.01 | <0.02 | — |
| 3 | 1.18 | 0.73 | 0.75 | 0.20 | 0.15 | <0.01 | <0.01 | <0.02 | — |
| 4 | 1.26 | 0.75 | — | 0.52 | 0.15 | 0.18 | <0.01 | <0.02 | 0.16 |

The first alloy only contains iron and no molybdenum and is given for comparison purposes. The three other alloys are according to the invention.

The studied alloys were cast into 70×380×1,000 mm plates.

The transformation conditions were as follows:
reheating: 8 hours at 500° C.
hot rolling up to 12 min.
cold rolling up to 3 min.
annealing: 6 hours at 450° C.

Following cleaning in an alkaline bath (immersion for 5 min. in 5% trisodium phosphate at 75° C.), rinsing and drying, enamelling was carried out on one face. The frit was dried for 2 min. in an oven at 150° C., followed by heating to 560° C. for 30 min.

After cooling the samples, the sheet was bent back onto itself and the appearance after bending was compared with that of standard samples.

For sample 1, after bending the enamel gave a good covering of the metal except in a few very small surface areas smaller than 1 mm² (good quality). In the case of the three other samples, the metal was completely covered by the enamel (very good quality).

The enamelled samples were also subjected to standard scaling tests, particularly the Spall test according to standard ASTM C 486, consisting of prolonged immersion in an aqueous solution containing 5% ammonium chloride and 1% antimony chloride and excellent results were obtained.

Samples were also prepared which were coated with an enamel layer, a PTFE coating, as well as samples coated with an enamel layer on one face and a PTFE coating on the other face.

The mechanical characteristics were measured after annealing, after enamelling only, after PTFE coating only and after enamelling plus PTFE coating. The results are given in the following Table II:

| ALLOY | ANNEALED STATE | | | AFTER ENAMELLING | | | AFTER PTFE COATING | | | AFTER ENAMELLING + PTFE | | |
|---|---|---|---|---|---|---|---|---|---|---|---|---|
| | $E_{0.2}$ | R | A | $E_{0.2}$ | R | A | $E_{0.2}$ | R | A | $E_{0.2}$ | R | A |
| 1 | 4.7 | 12.0 | 44.1 | 4.6 | 14.5 | 37.3 | 4.4 | 12.1 | 43.5 | 4.3 | 12.8 | 42.8 |
| 2 | 5.2 | 12.6 | 45.0 | 5.8 | 15.1 | 36.9 | 5.4 | 12.9 | 45.6 | 5.0 | 13.5 | 42.6 |
| 3 | 4.8 | 12.4 | 40.7 | 5.2 | 16.0 | 33.6 | 4.9 | 13.0 | 40.5 | 5.0 | 13.5 | 37.5 |
| 4 | 6.2 | 14.6 | 34.5 | 6.8 | 17.4 | 31.7 | 6.4 | 14.9 | 32.9 | 6.4 | 15.2 | 31.5 |

The 0.2% yield poing, ($E_{0.2}$) and the tensile strength (R) are measured in hectobars. The elongation (A) is measured in %. The results reveal the significance of adding molybdenum which permits both an improvement in the mechanical characteristics, particularly after enamelling and PTFE coating, as well as in the behavior of the enamel.

Finally, it is pointed out that the articles manufactured by means of these alloys have a good resistance to deformation, as is shown by ovalization and shaking tests according to French standard NF D 21501. The deformation resistance is better than that of alloy 3003.

We claim:

1. Aluminum-based alloy intended more particularly for the manufacture of enamelled articles, consisting essentially of the following composition (by weight):
    Si: 1 to 1.5%
    at least one of the elements of the group Fe-Ni-Co in a total quantity between 0.3 and 2%
    at least one of the elements of the group Mo-Nb-Ta in a total quantity between 0.05 and 1%
    Cr: 0.05 to 0.2%
    Cu: <0.2%
    Mg: <0.01%
    the remainder being aluminum with the standard impurities, the silicon operates in the alloy to enhance adhesion of the enamel while the elements from the groups Fe-Ni-Co and Mo-Nb-Ta favorably influence the adhesion of the enamel.

2. Alloy according to claim 1, characterized in that it contains up to 0.5% zirconium.

3. A method of enamelling to provide an enamel layer that strongly adheres to a supporting base comprising applying an enamelling composition onto a base of an aluminum alloy the composition of which consists essentially of by weight:
    Si: 1 to 1.5%
    at least one of the elements of the group Fe-Ni-Co in a total quantity between 0.3 and 2%
    at least one of the elements of the group Mo-Nb-Ta in a total quantity between 0.05 and 1%
    Cr: 0.05 to 0.2%
    Cu: <0.2%
    Mg: <0.01%
    the remainder being aluminum plus impurities, the silicon operates in the alloy to enhance adhesion of the enamel while the elements from the groups Fe-Ni-Co and Mo-Nb-Ta favorably influence the adhesion of the enamel.

4. The method as claimed in claim 3 in which the aluminum alloy contains up to 0.5% by weight zirconium.